United States Patent [19]
Mizutani et al.

[11] Patent Number: 6,113,137
[45] Date of Patent: Sep. 5, 2000

[54] PASSENGER COMPARTMENT STATE SENSING APPARATUS

[75] Inventors: Akitoshi Mizutani, Nishio; Hiroshi Uenaka, Okazaki; Jiro Nakano, Okazaki, all of Japan

[73] Assignees: Nippon Soken, Inc., Nishio; Toyota Jidosha Kabushiki Kaisha, Toyota, both of Japan

[21] Appl. No.: 08/951,585

[22] Filed: Oct. 16, 1997

[30] Foreign Application Priority Data

Oct. 16, 1996 [JP] Japan ................................. 8-273586

[51] Int. Cl.$^7$ ........................................................ B60R 21/32
[52] U.S. Cl. ........................................ 280/735; 280/734
[58] Field of Search ............................................. 280/735, 734

[56] References Cited

U.S. PATENT DOCUMENTS

| | | |
|---|---|---|
| 5,232,243 | 8/1993 | Blackburn et al. . |
| 5,330,226 | 7/1994 | Gentry et al. . |
| 5,366,241 | 11/1994 | Kithil . |
| 5,404,128 | 4/1995 | Ogino et al. . |
| 5,413,378 | 5/1995 | Steffens, Jr. et al. . |
| 5,446,661 | 8/1995 | Gioutsos et al. . |
| 5,490,069 | 2/1996 | Gioutsos et al. . |
| 5,494,311 | 2/1996 | Blackburn et al. . |
| 5,528,698 | 6/1996 | Kamei et al. . |
| 5,531,472 | 7/1996 | Semchena et al. . |
| 5,585,625 | 12/1996 | Spies . |
| 5,602,734 | 2/1997 | Kithil . |
| 5,624,132 | 4/1997 | Blackburn et al. . |
| 5,626,359 | 5/1997 | Steffens, Jr. et al. . |
| 5,702,123 | 12/1997 | Takahashi et al. ................. 280/735 |
| 5,829,782 | 11/1998 | Breed et al. ....................... 280/735 |
| 5,890,085 | 3/1999 | Corrado et al. .................... 280/735 |

FOREIGN PATENT DOCUMENTS

| | | |
|---|---|---|
| 6-317676 | 11/1994 | Japan . |
| 7-196006 | 8/1995 | Japan . |
| 7-237488 | 9/1995 | Japan . |
| 7237486 | 9/1995 | Japan . |
| 8-169289 | 7/1996 | Japan . |
| 8-258664 | 10/1996 | Japan . |

*Primary Examiner*—Eric Culbreth
*Attorney, Agent, or Firm*—Pillsbury Madison & Sutro LLP

[57] ABSTRACT

An apparatus which can accurately detect a state in a passenger compartment is provided. On the ceiling of a passenger compartment above the passenger seat, nine LEDs and three photodetectors are aimed downward, and infrared rays emitted from the LEDs are reflected by an object to be sensed and the reflected light beams are received by the photodetectors. A signal at a level corresponding to the distance to the object to be sensed is outputted from the photodetectors. A controller obtains a change with time in output of the photodetectors (i.e., motion speed from a differential value of the sensed distance, a displacement amount total from an integral value of the sensed distance, and a motion frequency), senses movement of the object to be sensed based thereon, determines whether the object to be sensed is a human, an animal, or other, and determines the kind of object. The controller then transmits a signal indicative of a result of the determination of the object to be sensed which is used to control how the vehicle's air bag is inflated.

19 Claims, 14 Drawing Sheets

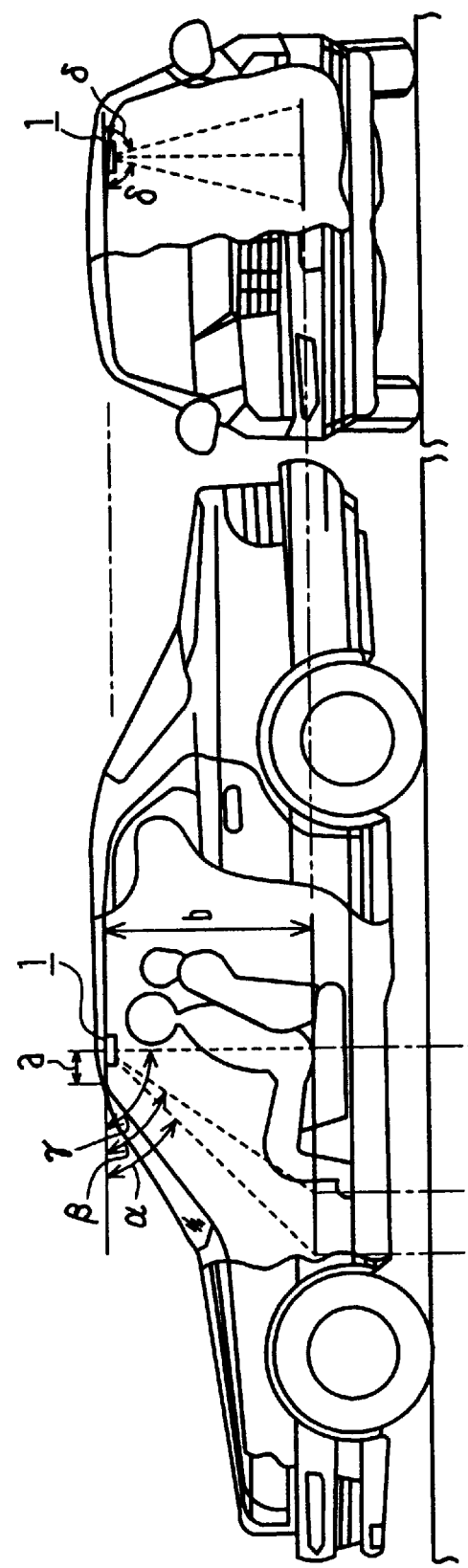
FIG. IA
FIG. IB
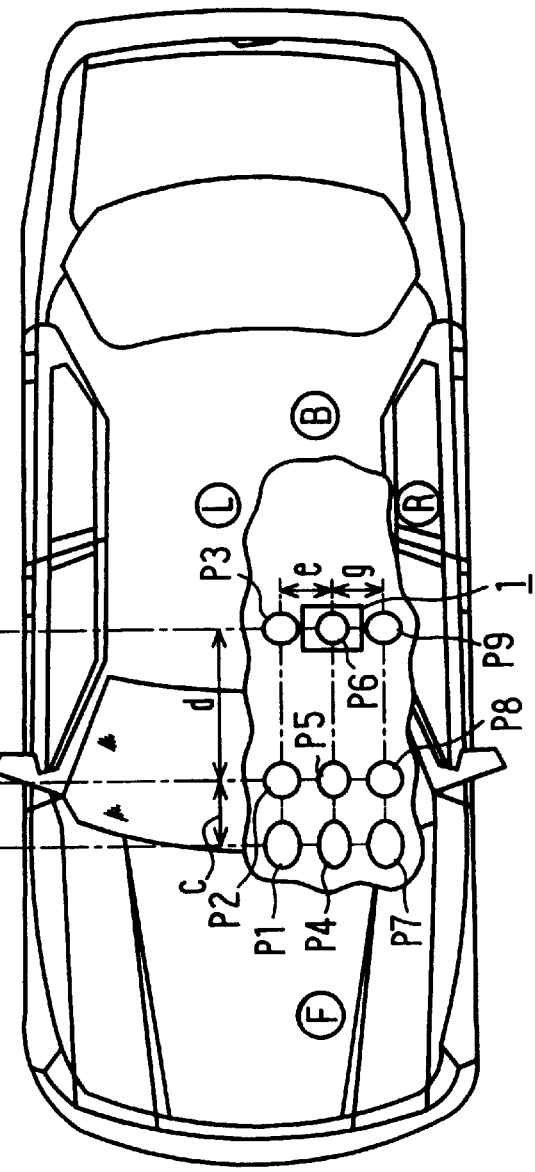
FIG. IC

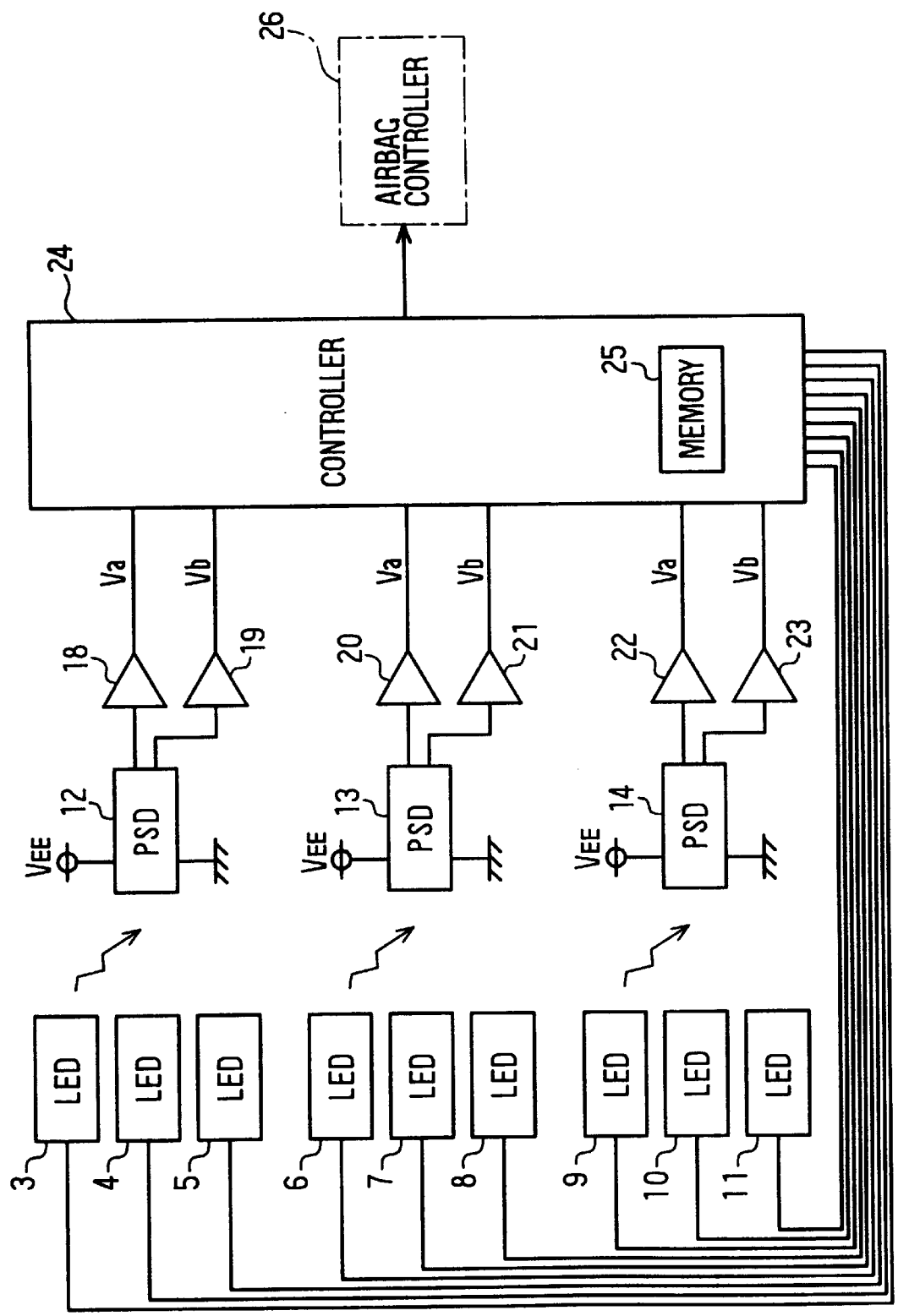

FORWARD-FACING CHILD SEAT

CHILD WITH HANDS ON INSTRUMENT PANEL

SEAT RECLINED (SLEEPING)

REAR-FACING CHILD SEAT

ADULT (REGULAR POSITION)

STANDING CHILD

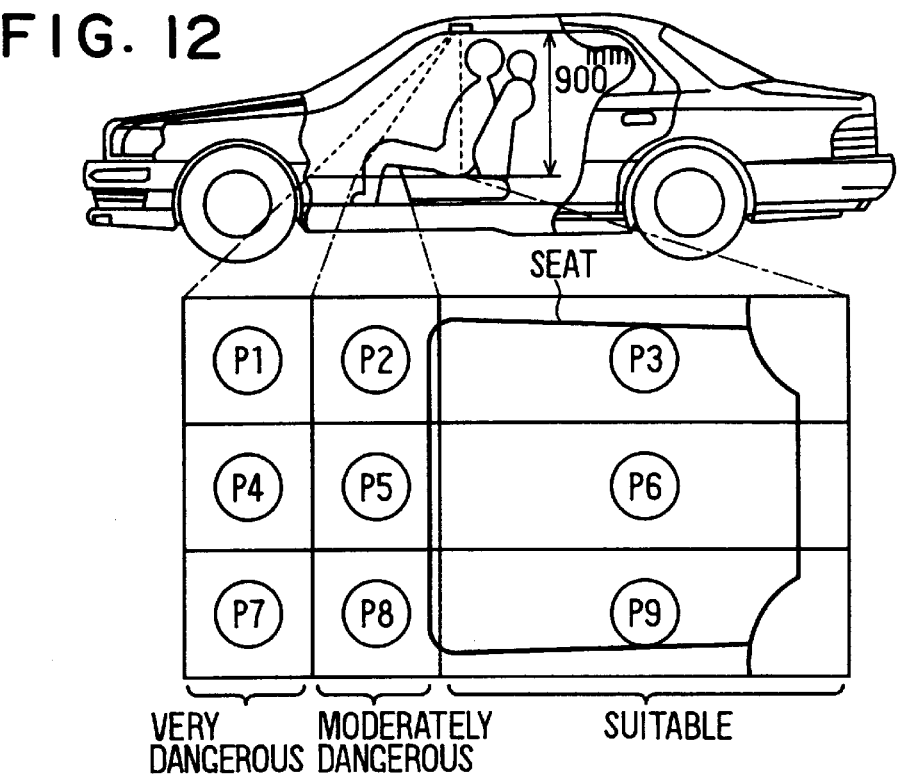

PERSON (ADULT)

SMALL MOVING BODY
(DOG, CAT)

STATIONARY BODY
(SMALL OBJECT)

FIG. 14

| No. | PASSENGER CONDITION PATTERN |
|---|---|
| 11 | SUITABLY POSITIONED BODY (ADULT SIZE) |
| 12 | SLIGHTLY DANGEROUSLY POSITIONED BODY (ADULT SIZE) |
| 13 | VERY DANGEROUSLY POSITIONED BODY (ADULT SIZE) |
| 14 | SUITABLY POSITIONED BODY (CHILD SIZE) |
| 15 | SLIGHTLY DANGEROUSLY POSITIONED BODY (CHILD SIZE) |
| 16 | VERY DANGEROUSLY POSITIONED BODY (CHILD SIZE) |
| 17 | SUITABLY POSITIONED BODY (INFANT SIZE) |
| 18 | SLIGHTLY DANGEROUSLY POSITIONED BODY (INFANT SIZE) |
| 19 | VERY DANGEROUSLY POSITIONED BODY (INFANT SIZE) |
| 110 | REAR-FACING CHILD SEAT |
| 111 | ⋮ |

FIG. 15

| No. | CLASSIFICATION PATTERN OF OBJECT TO BE DETECTED |
|---|---|
| 21 | ADULT |
| 22 | CHILD |
| 23 | SMALL ANIMAL (DOG, CAT) |
| 24 | STATIONARY BODY (HAND BAGGAGE, ETC.) |

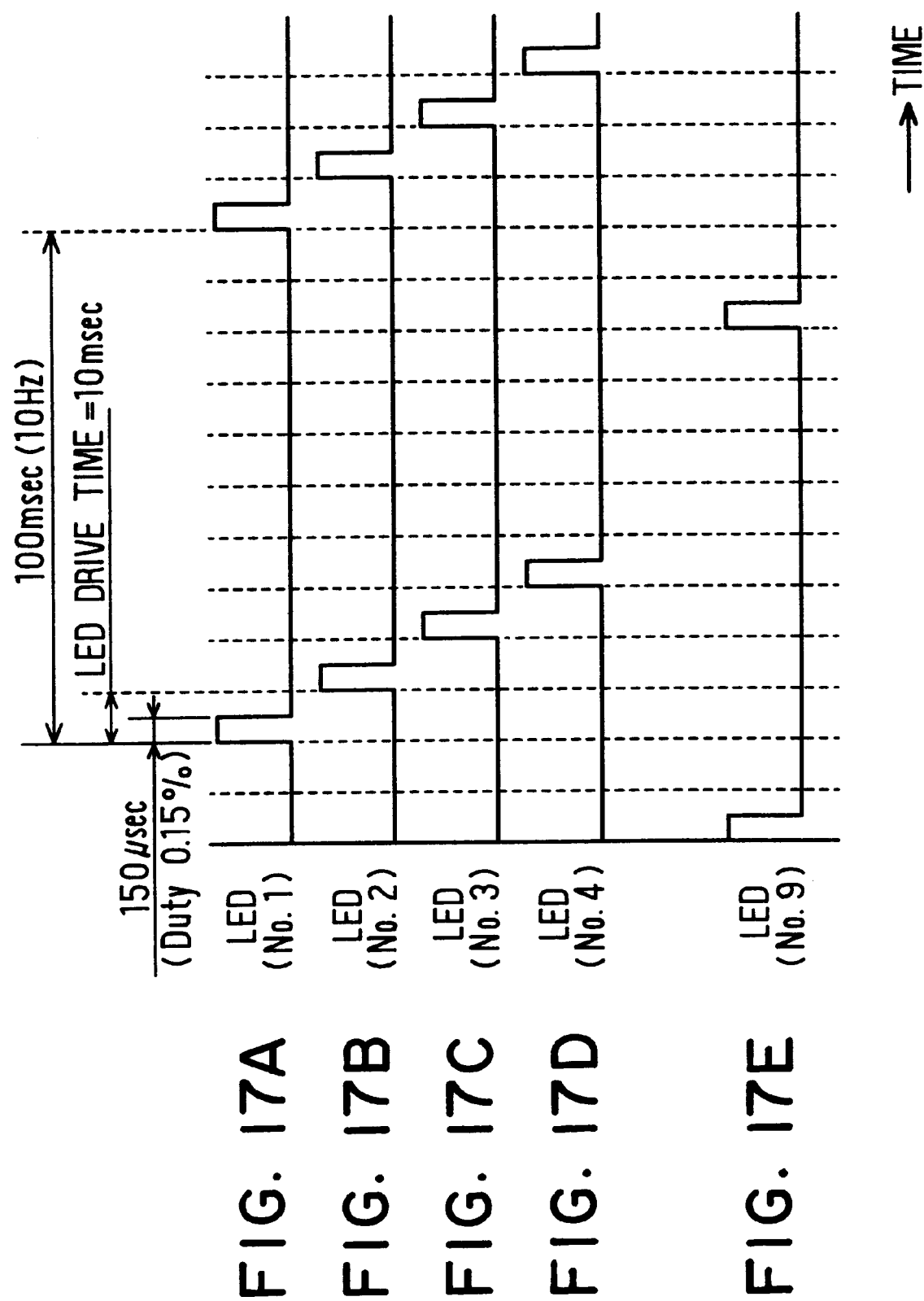

PASSENGER COMPARTMENT STATE SENSING APPARATUS

CROSS-REFERENCE TO RELATED APPLICATION

This application is related to Japanese Patent Application No. Hei 8-273586, incorporated herein by reference.

BACKGROUND OF THE INVENTION

1. Field of the Invention

The present invention relates to an apparatus for sensing the state in a passenger compartment of a vehicle, such as an occupant state or the like in the passenger compartment, which is applicable to an air bag occupant restraint system for a vehicle or the like.

2. Description of Related Art

An air bag occupant restraint system for vehicles is being equipped as standard equipment nowadays and a usage rate of an air bag for the front passenger's seat is increasing. For example, the air bag operates to dissipate the occupant's forward motion to be relatively slow relative to internal structure in the passenger compartment such as a handle, an instrumental panel, and the like and prevents the occupant from directly striking the internal structure, thereby preventing the occupant from being injured by a crash of the vehicle.

An air bag system uniformly inflates an air bag by a collision detection signal of a collisison sensor which detects a crash of a vehicle basically independently of the state or the physique of the occupant.

From the viewpoint of protecting the occupant, however, it is not always preferable for the vehicle having the air bag system to uniformly inflate the air bag in the event of a crash. That is, it may be preferable from the viewpoint of occupant protection that the air bag is not inflated in a certain range where the state and the physique of the occupant are specified. Also, it may be preferable to change an inflating speed of the air bag and inflate the air bag in a specific range where the state and physique of the occupant are different from those of the above case.

For an occupant in an improper state contrary to a proper state where the function of the air bag effectively works, for example, in a state where an infant does not sit down on the seat but stands between the instrument panel and the seat (child standing state), in a state where an occupant sits on the seat but does not fasten a seat belt, bends forward, and the occupant's head is close to the instrument panel or the like, it is necessary to operate the air bag in correspondence with the state of the occupant.

Since the air bag is a system to protect basically an occupant, namely, a human, a means for very accurately discriminating the type of occupant as a human is necessary. With respect to an air bag for the front passenger seat, in a crash of a vehicle, the air bag is uniformly inflated even when an object (luggage or the like) is put on the passenger seat or no occupant exists. This operation is meaningless from the viewpoint of the inherent object of the air bag. A problem of increase in repair fee for air bag replacement or the like also occurs. Consequently, it is necessary to specify the kind of occupant, e.g., human, small animal, or other object.

SUMMARY OF THE INVENTION

In view of the above problems of the prior art, it is an object of the present invention to provide an apparatus which can accurately grasp the occupancy state in a vehicle passenger compartment.

The above object is achieved by providing an apparatus which can accurately detect a state in a passenger compartment. On the ceiling of a passenger compartment above the passenger seat, nine LEDs and three linear photodetectors are aimed downward, and infrared rays emitted from the LEDs are reflected by an object to be sensed and the reflected light beams are received by the photodetectors. A signal at a level corresponding to the distance to the object to be sensed is outputted from the photodetectors. A controller obtains a change with time in output of the photodetectors (i.e., motion speed from a differential value of the sensed distance, a displacement amount total from an integral value of the sensed distance, and a motion frequency), senses movement of the object to be sensed based thereon, determines whether the object to be sensed is a human, an animal, or other, and determines the kind of object. The controller then transmits a signal indicative of a result of the determination of the object to be sensed which is used to control how the vehicle's air bag is inflated.

In this way, the system can discriminate whether the object to be sensed is a human, an animal, or other, and can inflate the air bag only in the case where a human is present. Moreover, the rate of air bag inflation can be controlled so that the bag is inflated more slowly for a child or person of small stature in order to avoid injury.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 1A–1C are diagrams showing a vehicle according to a first preferred embodiment of the present invention;

FIG. 8 is a block diagram showing an electrical construction of a sensing apparatus according to the first embodiment;

FIG. 12 is a diagram for explaining the degrees of danger of various occupant positions in the embodiment;

FIGS. 14 and 15 are diagrams showing occupant state patterns in the first embodiment;

FIG. 16 is a diagram showing the format of an output signal in the first embodiment;

FIGS. 17A–17E timing charts for explaining data fetch timings from linear photodetectors in the embodiment;

DETAILED DESCRIPTION OF THE PRESENTLY PREFERRED EXEMPLARY EMBODIMENTS

First Embodiment

A first embodiment of the invention will be described below with reference to the drawings.

FIGS. 1A–1C show a vehicle in which a sensing apparatus according to the embodiment is mounted. The vehicle is right-hand steering wheel type vehicle, and a distance sensor 1 is mounted on the ceiling of the passenger compartment above the passenger seat. The details of the distance sensor 1 are shown in FIGS. 2–4.

Figure 2:
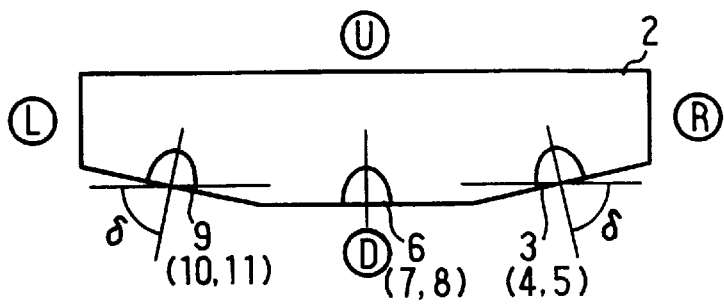
FIG. 2 is a diagram of a sensor according to the first embodiment as viewed from the front of the vehicle.
Figure 3:
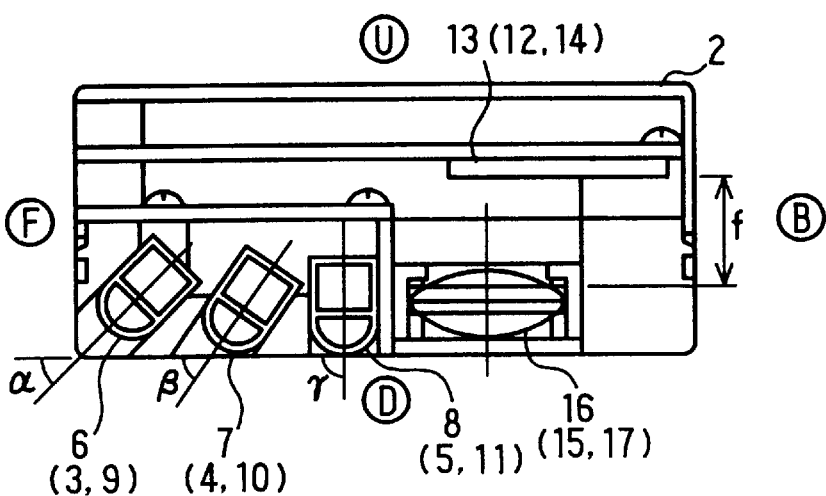
FIG. 3 is a vertical cross-sectional view of the sensor.
Figure 4:
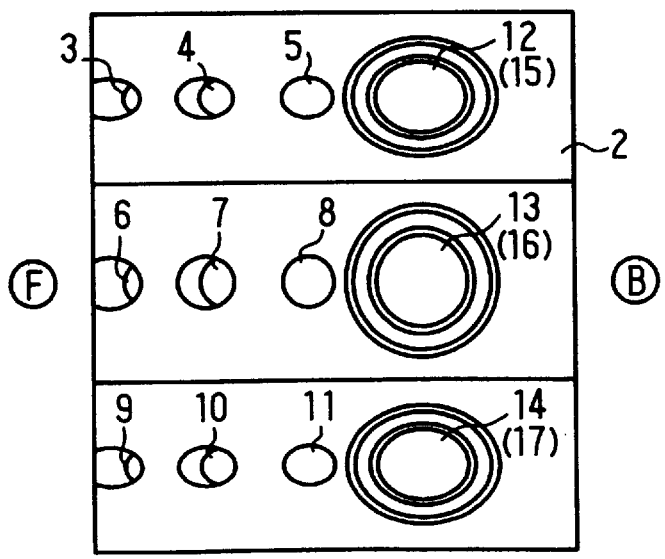
FIG. 4 is a diagram of the sensor when seen from below in the passenger compartment.

In FIGS. 2–4, nine infrared LEDs (electroluminescent elements) 3–11 are fixed to a sensor housing 1 and 2 are aimed downward in the passenger compartment. Linear photodetectors 12–14 (also known as optical position sensing devices, or "PSD"s in the appended drawings) are also fixed to the sensor housing 2 and are aimed downward in the passenger compartment. Specifically, as shown in FIG. 3, the three infrared LEDs 6–8 are arranged in a line in the forward-backward direction and the photodetector 13 is arranged behind them, thereby constituting a linear sensor assembly. On the right side of the infrared LEDs 6–8, the three infrared LEDs 3–5 are arranged linearly in the forward/backward direction and the photodetector 12 is arranged behind them, thereby constituting a linear sensor assembly. On the left side of the infrared LEDs 6–8, the three infrared LEDs 9–11 are arranged linearly in the forward/backward direction and the photodetector 14 is arranged behind them, thereby constructing a linear sensor assembly.

As noted above, the vehicle shown is a right-hand drive type in which the driver is seated on the right and a front seat passenger may be seated on the left. Such vehicles are typically used in Great Britain, Japan and many other countries. Variations of this and other embodiments of the present invention for use with left-hand drive vehicles in which the driver is on the left and the passenger on the right will of course be apparent to those of ordinary skill in the art.

With respect to the LEDS 6–8, 3–5 and 9–11 in the respective lines arranged in the forward/backward direction, as shown in FIG. 3, the LEDs 3, 6, 9 in the front row are inclined at an angle of a $\alpha=45°$ from horizontal, the LEDs 4, 7, 10 in the second row are inclined at $\beta=55°$ from horizontal, and the rearmost LEDs 5, 8, 11 are inclined at $\gamma=90°$ from horizontal, that is, arranged to aim straight down. As mentioned above, the front LEDs, 3, 6, 9, the LEDs 4, 7, 10 in the second row, and the rearmost LEDs 5, 8, 11 are arranged at different irradiation angles, so that the sensed area under the sensor is enlarged and the infrared rays arrive at predetermined positions.

As shown in FIG. 2, the LEDs 6–8 and the photodetector 13 constituting the line sensor aim straight down, the LEDs 3–5 and the photodetector 12 constituting the linear sensor assembly are arranged at an angle of $\delta=76°$ from horizontal aim toward the right side, and the LEDs 9–11 and the photodetector 14 constituting the linear sensor assembly are arranged at an angle of $\delta=76°$ from horizontal to aim toward the left side.

As mentioned above, the three linear sensor assemblies are arranged at irradiation angles different in the lateral direction, so that a sensing range under the sensor is a two-dimensional plane. The infrared rays are emitted from the sensor to form spots on the plane. The infrared ray irradiation points (regions) are shown by areas P1–P9 in FIG. 1B. According to this embodiment, the nine infrared ray irradiation points P1–P9 are formed 800 mm (b in FIG. 1A) below the sensor 1 at intervals of 200 mm (e and g in FIG. 1B) in the lateral direction and at intervals of 250 mm(c in FIG. 1B) and 550 mm (d in FIG. 1B) in the forward/backward direction, thereby forming a two-dimensional orthogonal array in a detection plane of the sensors.

Further, as shown in FIGS. 3 and 4, aspherical lenses 15–17 are arranged on the light receiving face sides (front stage parts) of the photodetectors 12–14. Reflected infrared light reaching the photodetectors 12–14 is condensed by the respective aspherical lenses 15–17, thereby reducing aberration. The mounting interval between the light receiving face of each of the photodetectors 12–14 and each of the aspherical lenses 15–17 is set so that the focus (f) of each of the aspherical lenses 15–17 falls on the light receiving face of each of the photodetectors 12–14. The photodetectors 12–14 and the aspherical lenses 15–17 are mounted parallel with each other.

Figure 5A:
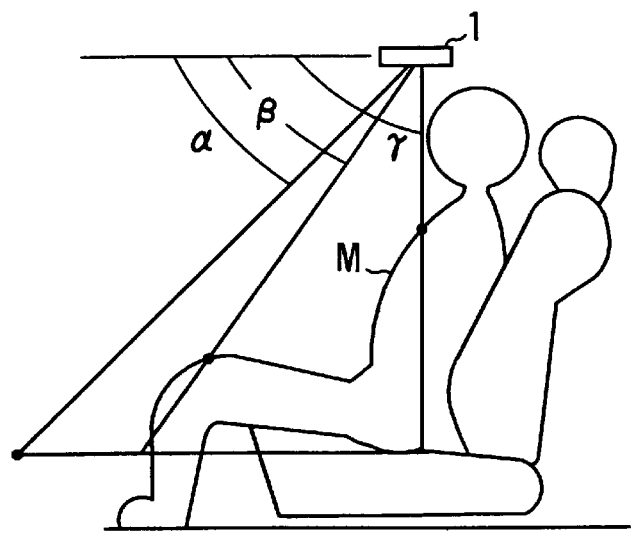
FIGS. 5A and 5B are diagrams for explaining a sensing region of the sensor.
Figure 5B:
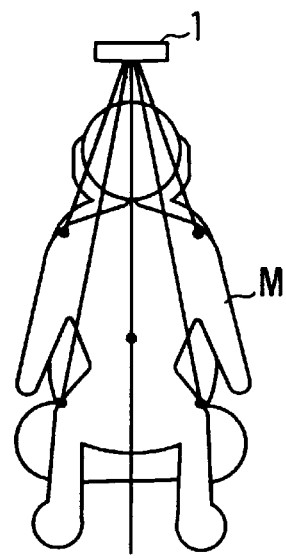
Figure 6:
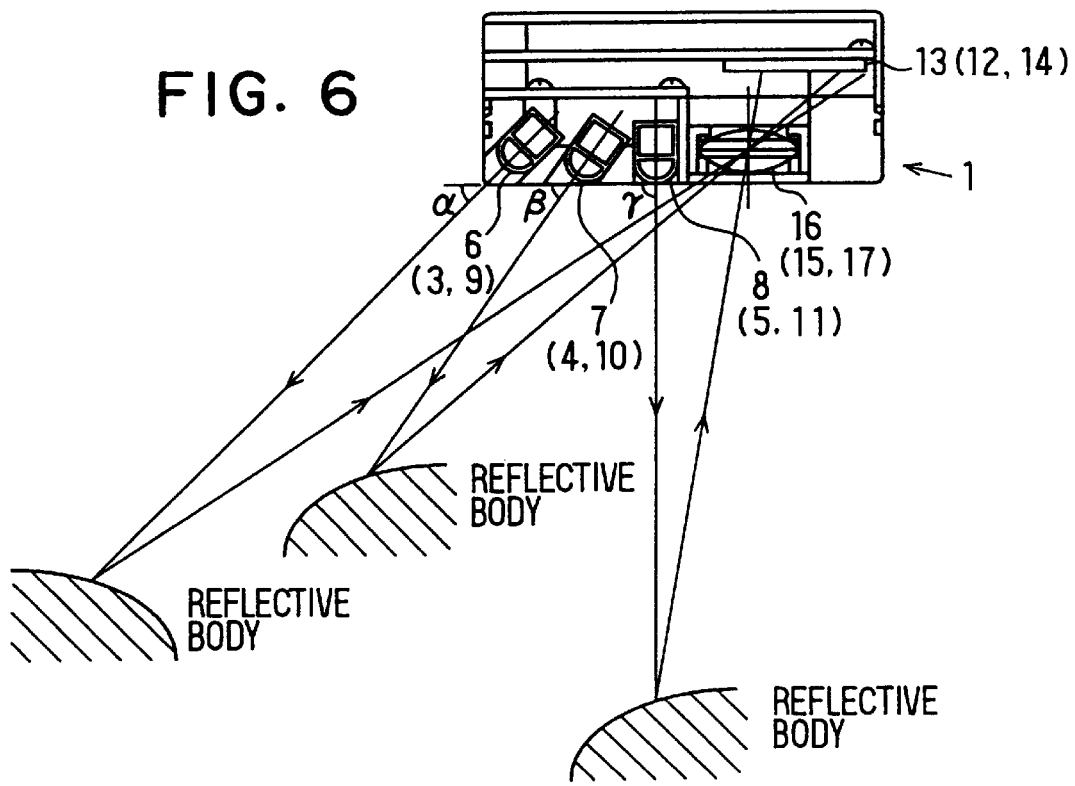
FIGS. 6 and 7 are diagrams for explaining the operation of the sensor.

As shown in FIGS. 5A and 5B, when an occupant (H) gets in a vehicle and is in a plane sensing range formed by the infrared ray irradiation points (regions) P1–P9, the infrared rays from the LEDs 3–11 in the sensor 1 mounted above the occupant (H) are reflected by the body parts (e.g., head, arms, knees, and so on) of the occupant (M). As shown in FIG. 6, the reflected light beams converge due to the aspherical lenses 15–17 and enter the photodetectors 12–14, respectively.

Figure 7:
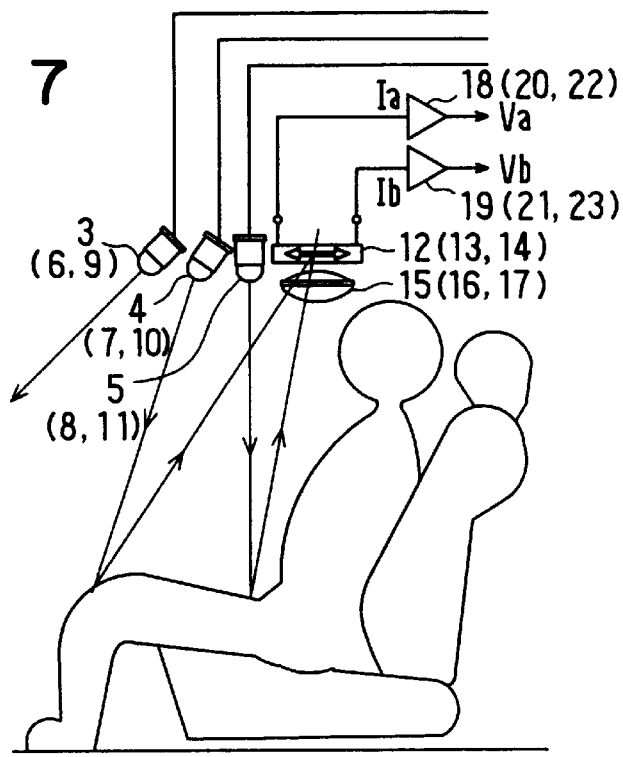

As shown in FIG. 7, output currents Ia and Ib of each of the photodetectors 12–14 are divided to correspond to a distance from the incident spot to an electrode of the respective photodetector and are taken out. In the sensor 1, current-to-voltage converters 18 and 19 are connected to the photodetector 12 (similarly, current-to-voltage converters 20 and 21 are connected to the photodetector 13 and current-to-voltage converters 22 and 23 are connected to the photodetector 14). The current-to-voltage converters 18–23 convert the output currents Ia and Ib of the photodetectors 12–14 to voltages Va and Vb, respectively.

That is, as shown in FIG. 6, the light beams emitted from the infrared LEDs 3–11 are reflected and the reflected light beams are received by the photodetectors 12–14. As shown in FIG. 7, an output difference (Ia–Ib) corresponding to the distance from the sensor to the object to be sensed according to the converged position in each of the photodetectors is obtained. The output is converted to a voltage by each of the converters 18 to 23.

FIG. 8 shows an electrical construction of the passenger compartment state sensing apparatus.

A controller 24 serving as determining means and signal transmitting means is implemented mainly by a microprocessor and has a memory 25 serving as storage means. Data regarding standard patterns for pattern matching is previously stored in the memory 25.

Output terminals of the current-to-voltage converters 18–23 of the photodetectors 12–14 are connected to the controller 24. The infrared LEDs 3–11 are also connected to the controller 24. The controller 24 can allow the LEDs 3–11 to sequentially emit light beams by pulse driving. Further, the photodetectors 12–14 are connected to power sources and are always operative ("always" is on condition that the main power source of the sensor is "on"). The LEDs 3–11 and the controller 24 are also connected to the power sources (not shown), respectively and are operative.

Figure 9:
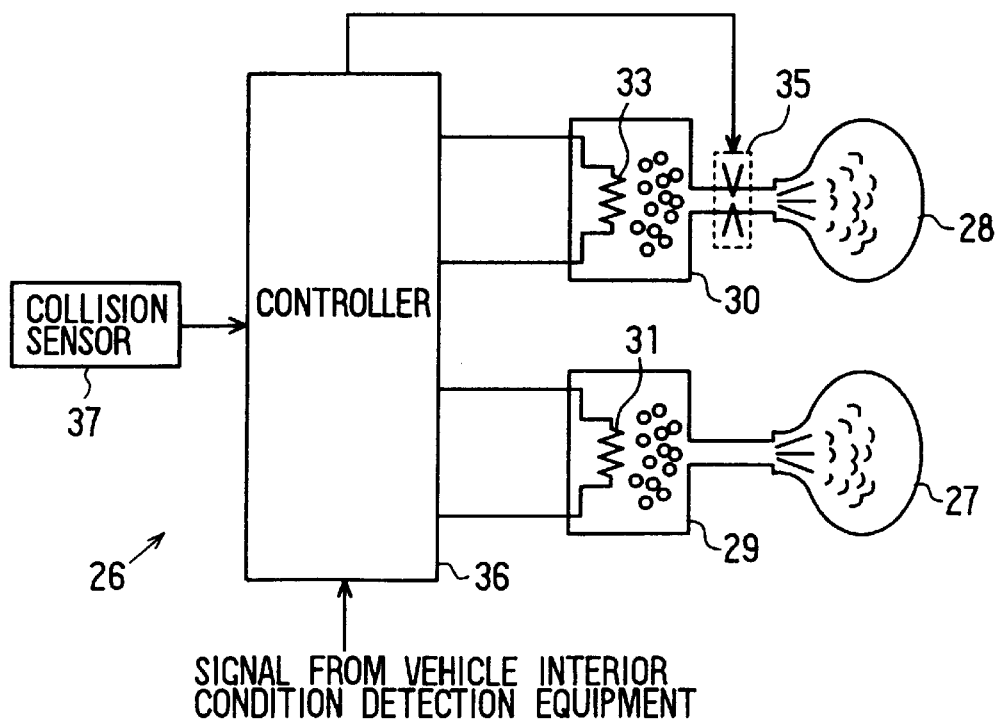
FIG. 9 is a diagram of the entire structure of an air bag controller according to the first embodiment.

An air bag controller 26 as a device external to the passenger compartment state sensing apparatus is connected to the controller 24. FIG. 9 shows the air bag controller 26.

The air bag controller 26 has an air bag (bag member) 27 for the driver's seat, an air bag (bag member) 28 for the passenger seat, an inflator 29 for the driver's seat, and an inflator 30 for the passenger seat. By driving an ignition device 31 provided in the inflator 29 for the driver's seat, gas is generated in the inflator 29, and the air bag 27 is filled with the gas and is inflated. Similarly, by driving an ignition device 33 provided in the inflator 30 for the passenger seat, gas is generated in the inflator 30, and the air bag 28 is filled with the gas and is inflated. A variable restrictor 35 is provided between the air bag (bag member) 28 for the passenger seat and the inflator 30 for the passenger seat. The inflation speed of the air bag (bag member) 28 for the passenger seat can be adjusted by changing a restriction amount.

When a collision detection signal from a collision sensor 37 is received, a controller 36 provided in the air bag controller 26 drives the ignition devices 31, 33 of the inflators 29, 30 and allows the air bags to be inflated. The controller 36 also receives signals from the passenger compartment state sensing apparatus and controls the ignition devices 31, 33 and the variable restrictor 35 in accordance with the contents of the signal indicative of the state of the passenger compartment.

The operation of the passenger compartment state sensing apparatus constructed as described above will be described below with reference to the flowchart of FIG. 10.

In Step 101, the controller 24 time-divisionally drives the infrared LEDs 3 to 11 to sequentially emit light beams. Specifically, the light beams are emitted to the points in accordance with the order of P1, P4, P7, P2, P5, P8, P3, P6, and P9 as shown in FIG. 1B. In Step 102, the controller 24 fetches data from the photodetectors 12–14 synchronously with pulse periods of the electroluminescent elements, thereby executing a distance measurement operation. Further, the controller 24 receives the voltages (analog voltages) Va and Vb from the current-voltage converters 18–23 synchronously with entering timings of the reflected light beams and converts the analog voltages into digital values in Step 103. The controller 24 further converts the digital value into a distance (absolute position) L by Equation (1) in Step 104. The process is executed with respect to each of the LEDs 3–11 (each of the irradiation spots P1 to P9).

$$L = k \frac{Va}{Vb} \quad (1)$$

where k is a constant of proportionality.

That is, Va/Vb is calculated from the spot position signal, thereby obtaining the absolute position signal. Further, the constant of proportionality k which varies according to the optical axis of a reflected light beam is multiplied, thereby calculating the reflection distance. According to the embodiment, as shown in FIG. 17, nine position level signals of reflected light beams are repeatedly fetched with a reflection light beam receiving time of 150 ms, a cycle of 100 ms, and a time division interval of 10 ms with respect to one LED. The controller 24 samples the position level signal during the light receiving time of 150 ms, thereby calculating the reflection distance.

In Step 105, the controller 24 calculates an occupant shape (physique) pattern by connecting the nine reflection spots and a distribution pattern regarding the position relative to the instrument panel. In Step 106, the controller 24 performs pattern matching between the obtained shape and distribution patterns with standard patterns which are previously stored in the memory and selects a most similar standard pattern.

The process of Step 106 will be described in detail. The standard patterns regarding the shapes (physiques) are previously stored in the memory 25. As the standard patterns, a pattern indicative of an adult size, a pattern indicative of a child size, a pattern indicative of a size of a small animal (dog, cat, or the like), and a pattern indicative of a size of a stationary object (hand luggage or the like) are prepared. That is, shapes in sizes of human beings including a child and an adult and shapes of small animals, a child seat, and the like are patterned and stored. The standard patterns will be described further. As shown in FIGS. 11A–11F, a pattern of an adult sitting in a normal position (FIG. 11A), a pattern of an adult lying on a reclined seat (FIG. 11B), a pattern of an infant sitting on a child seat which faces forward (FIG. 11C), a pattern of a child standing (FIG. 11D), a pattern of an infant sitting on a child seat which faces backward (FIG. 11E), a pattern of a child with his hands on the instrument panel (FIG. 11F), and the like are included.

Using the pattern matching regarding the shape (physique), the controller 24 determines whether the size is of the adult, child, small animal (dog, cat, or the like), stationary object (hand luggage or the like), or the like.

The standard distribution patterns regarding the position relative to the instrument panel are also previously stored in the memory 25. The standard distribution patterns are plane (two-dimensional) distribution patterns such as, as shown in FIG. 12, a distribution pattern in which the occupant state is proper for ordinary air bag inflation, a distribution pattern in which the occupant state is slightly dangerous, and a distribution pattern in which the occupant state is very dangerous. That is, the distribution patterns are used to determine the degree of danger as follows. When the occupant is positioned at the measurement point P1, P4, or P7 where the distance between the instrument panel and the occupant is short, the danger is "large". When the occupant is positioned at the measurement point P2, P5, or P8 where the distance between the instrument panel and the occupant is medium-sized, the danger is "medium". When the occupant is positioned in the measurement point P3, P6, or P9 where the distance between the instrument panel and the occupant is longest, the danger is "little" and the occupant state is proper.

Figure 10:
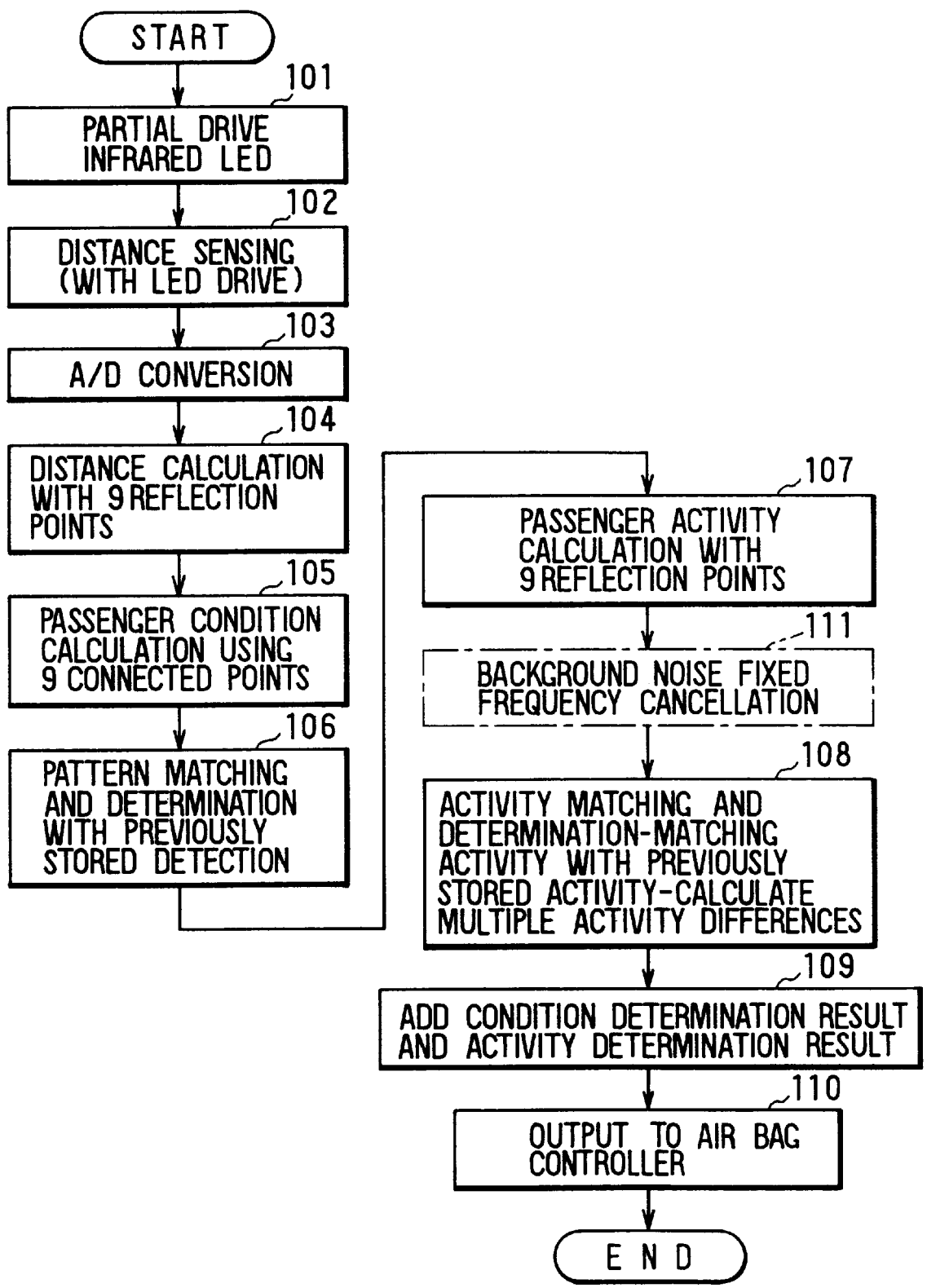
FIG. 10 is a flowchart for explaining the operation of the embodiment.
Figure 11C:
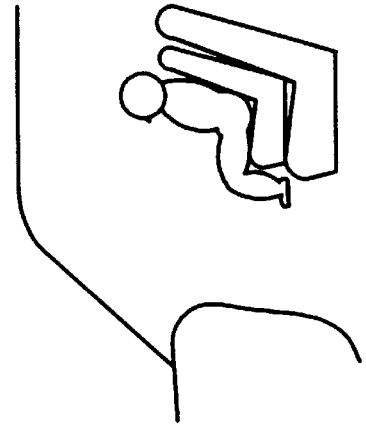
FIGS. 11A–11F are diagrams illustrating states of occupants in a vehicle passenger compartment.
Figure 11F:
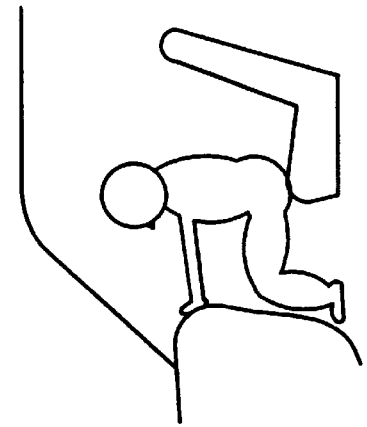
Figure 11B:
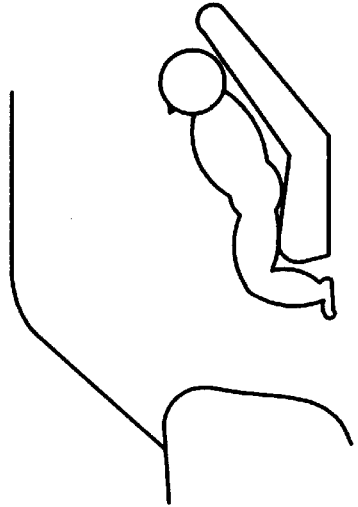
Figure 11E:
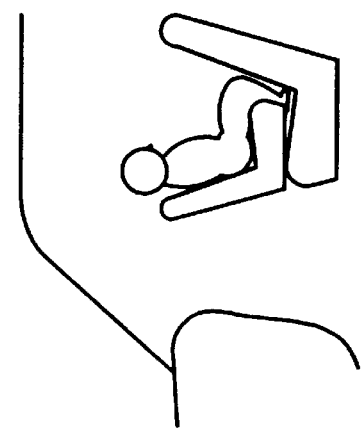
Figure 11A:
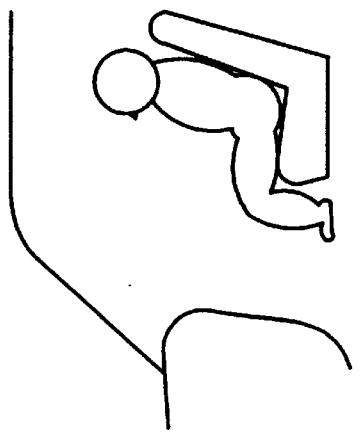
Figure 11D:
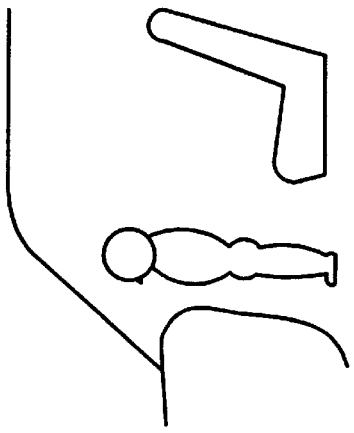
Figure 13A:
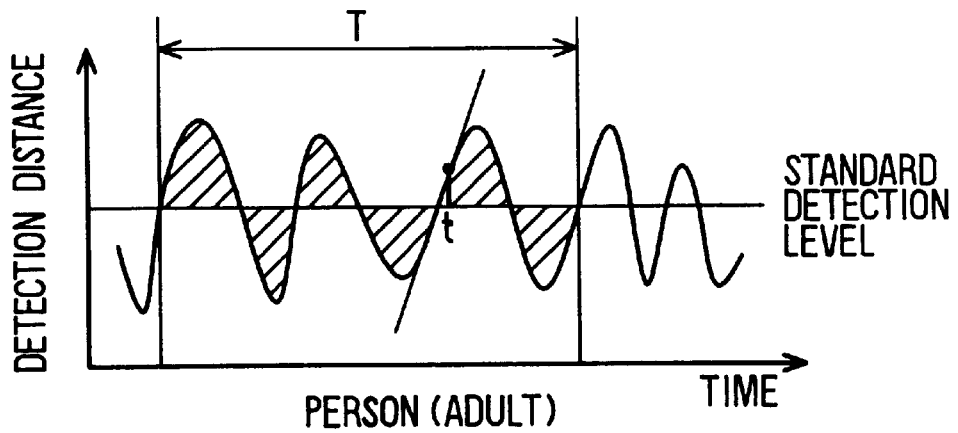
FIGS. 13A–13C are graphs showing variations in sensed distance with time in the first embodiment.
Figure 13B:
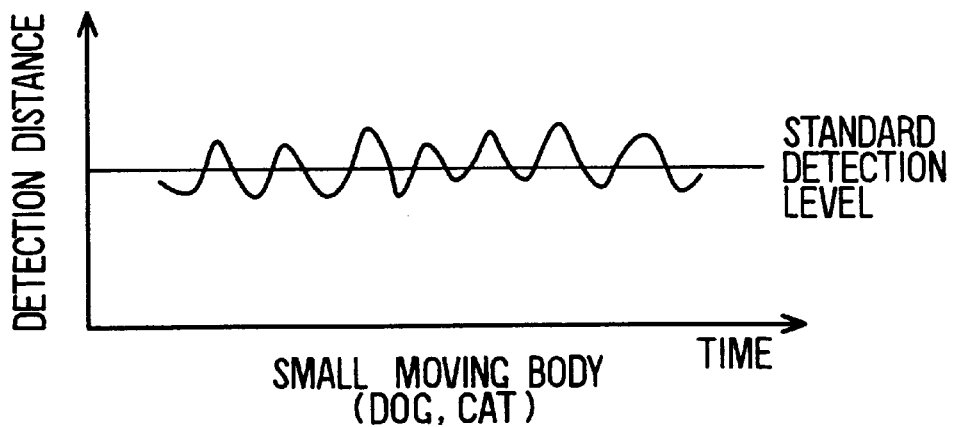
Figure 13C:
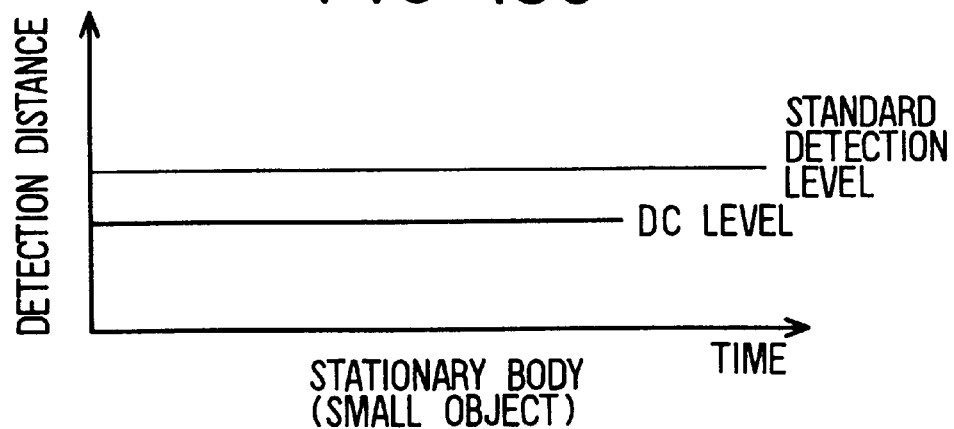

Referring again to the flowchart, in Step 107 in FIG. 10, the controller 24 calculates a differential value, an integral value, and a frequency of the measurement value in each of the spot positions P1 to P9 as shown in FIGS. 13A–13C. That is, motion speed from the differential value of the sensed distance at time (t), a displacement amount total from the integral value of the sensed distance for a period of (T), and a motion frequency are obtained. Consequently, characteristics of the movement peculiar to the object to be sensed are extracted from the change with time in output of the sensor 1. From the foregoing, it is clear that controller 24 includes integrating means.

Further, in Step 108 in FIG. 10, the controller 24 executes pattern matching between the movement pattern and the standard patterns previously stored in the memory 25 and selects the standard pattern most similar to the movement pattern.

The process of Step 108 will be described in detail. The standard patterns are previously stored in the memory 25. As the standard patterns, a pattern indicative of a human as shown in FIG. 13A, a pattern indicative of a small animal (dog, cat, or the like) as shown in FIG. 13B, and a pattern indicative of a stationary object as shown in FIG. 13C are prepared. In the pattern indicative of the human, the motion speed is relatively low (compared with the small animal), the displacement amount is large, and the motion frequency is low. In the pattern indicative of the small animal (dog, cat, or the like), the motion speed is high, the displacement amount is small, and the motion frequency is high. In the pattern indicative of the stationary object, the motion speed is zero, the displacement amount is zero, and the motion frequency is zero (direct current).

That is, the movements peculiar to a human, a small animal, and other objects are different. When a human or a small animal exists, the kind of the occupant can be specified by a quantifying process of the peculiar movement (fluctuation in three-dimensional space within a predetermined time).

The controller 24 determines the kind of object to be sensed, that is, whether the object is a human, a small animal (dog, cat, or the like), or a stationary object (hand luggage or the like) from the change with time in output of the sensor 1.

Referring again to the flowchart, in Step 109 in FIG. 10, the controller 24 performs a synthetic determination from both of the result of the shape/distribution determination (the result of the process of Step 105) and the result of the movement determination (the result of the process of Step 108). An example of the shape/distribution discriminating result (the result of the process of Step 105) is shown in FIG. 14 and an example of the movement discrimination result (the result of the process of Step 108) is shown in FIG. 15.

In FIG. 14, state 11 denotes an object (adult size) in a proper position; state 12 an object (adult size) in a slightly dangerous position; state 13 an object (adult size) in a very dangerous position; state 14 an object (child size) in a proper position; state 15 an object (child size) in a slightly dangerous position; state 16 an object (child size) in a very dangerous position; state 17 an object (infant size) in a proper position; state 18 an object (infant size) in a slightly dangerous position; state 19 an object (infant size) in a very dangerous position; state 110 a child seat facing backward; and the like.

In FIG. 15, state 21 denotes an adult; state 22 a child; state 23 a small animal (dog, cat); and state 24 a stationary object (hand luggage or the like).

When the state 12 (object in a slightly dangerous position) in FIG. 14 and the state 22 (child) in FIG. 15 are obtained, the controller 24 determines that the occupant is a human of the child size in the slightly dangerous position. When the state 14 (object (child size) in a proper position) in FIG. 14 and the state 24 (stationary object) in FIG. 15 are obtained, the controller 24 determines that the occupant is a stationary object in the child size in the proper position.

In Step 109, when the occupant distribution shows a distribution in which the occupant is close to the instrument panel, the solid shape (physique) shows the child level, and the peculiar movement shows the pattern of the human, the controller 24 determines from the above three factors that the occupant is a standing child.

The controller 24 transmits a signal indicative of the state in the passenger compartment to the air bag controller 26 in Step 110 in FIG. 10. The contents of the output are shown in FIG. 16. The synthetic determination result is expressed by six bits, consisting of two bits of position information, two bits of shape information, and two bits of type information (result of the specification of the object to be sensed). As the position information, "01" indicates a very dangerous position; "10" a slightly dangerous position; and "11" a proper position. As the shape information, "00" shows an adult size; "01" a child size;

"10" an infant size; and "11" a child seat facing backward. As the kind information, "00", shows an adult; "01" a child; "10" a small animal; and "11" a stationary object. "010111" as shown in FIG. 16 denotes a stationary object in a child size in a very dangerous position.

On the other hand, in the air bag controller 26 of FIG. 9, when a signal from the passenger compartment state sensing apparatus is received, control according to the contents of the signal indicative of the state of the passenger compartment is performed. That is, the controller 36 does not allow the air bag to be inflated when the state and the physique of the occupant are within a certain specific range. When the occupant body is specified (other than a human, that is, a small animal or other object) or when there is no occupant on the passenger seat, the inflation of the air bag is inhibited in a crash of the vehicle to inhibit a meaningless operation of the air bag, thereby preventing an increase in the repair fee for replacement of the air bag.

The controller 36 regulates the inflating speed of the air bag in another specific range of the kind of the occupant (human or other object), the state of the occupant, and the physique of the occupant. For an occupant in an improper state contrary to the proper state where the function of the air bag effectively works, for example, when an infant does not sit down on the seat but stands between the instrument panel and the seat (child standing state), a state where an occupant sits down on the seat, does not fasten the seat belt, and bends forward, so that the head is close to the instrument panel, or the like, the air bag is inflated at an operating speed corresponding to the relevant state by narrowing the gas passage by controlling the variable restrictor 35 in FIG. 9. That is, when the child standing state is determined, the controller 36 sets the air bag inflating speed to a very low speed.

As mentioned above, the embodiment has the following characteristics.

A) The sensor 1 for outputting a signal at a level corresponding to the distance to the object to be sensed is arranged in the passenger compartment. The controller (specifying means, signal transmitting means) 24 senses the movement peculiar to the object to be sensed from the change with time in output of the sensor 1 and specifies the kind of object to be sensed in Steps 107 and 108 in FIG. 10. In Step 110 in FIG. 10, the controller 24 transmits the signal indicative of the result of the specification of the object to be sensed. By using the transmitted signal, the air bag system can be properly controlled. As mentioned above, the state in the passenger compartment such as an occupant can be accurately grasped from the change with time in output of the sensor 1.

B) The controller 24 discriminates whether the object to be sensed is a human, an animal, or other. By using the transmission signal, the air bag system can inflate the air bag only in the case where a human is present.

Second Embodiment

A second preferred embodiment of the present invention will be described below mainly with respect to points different from the first embodiment.

When a plurality of occupants exist in the sensing range, the controller 24 according to the second embodiment has a function of determining the kind (human, small animal, or other object) and the distribution state of each occupant from difference in distribution, shape, and peculiar movement.

Figure 18:
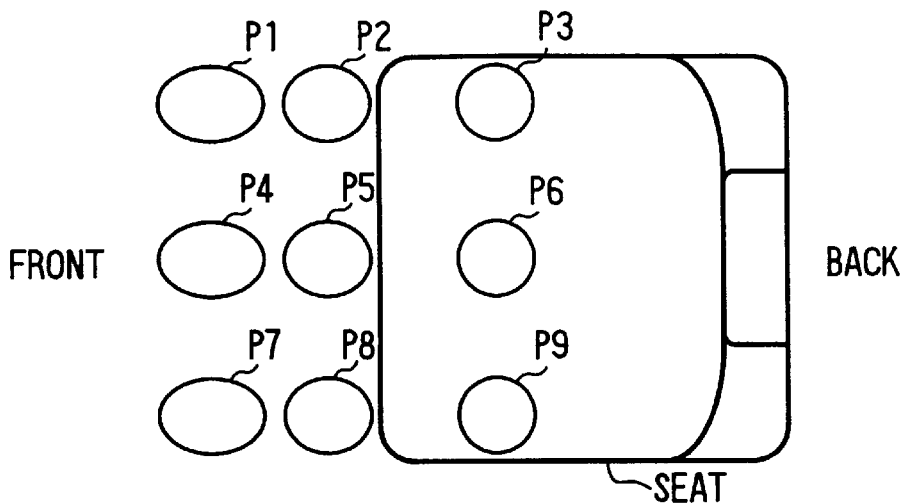
FIG. 18 is a diagram for explaining a sensing region in a second embodiment.
Figure 19A:
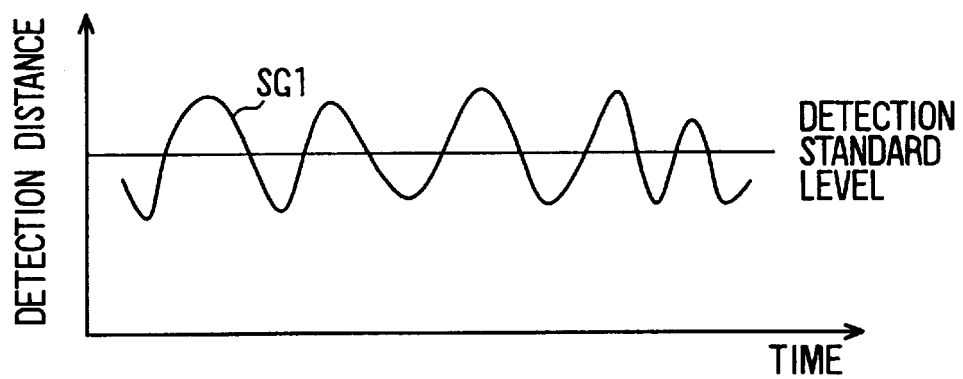
FIGS. 19A and 19B are diagrams showing variations in sensed distance with time in the second embodiment.
Figure 19B:
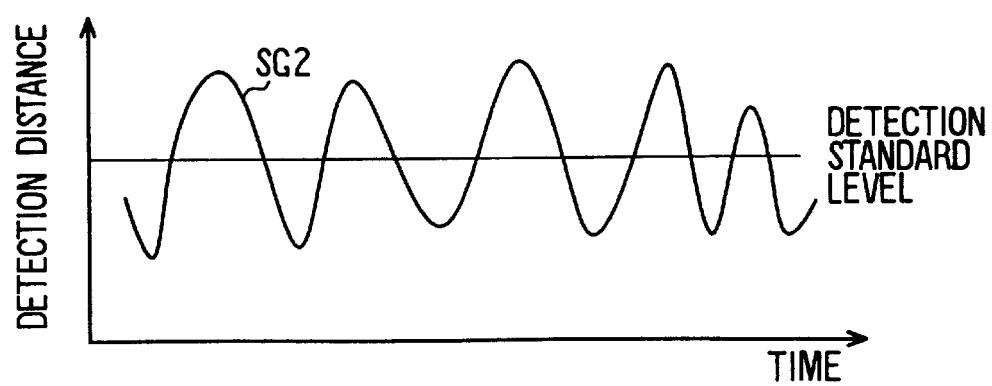
Figure 20:
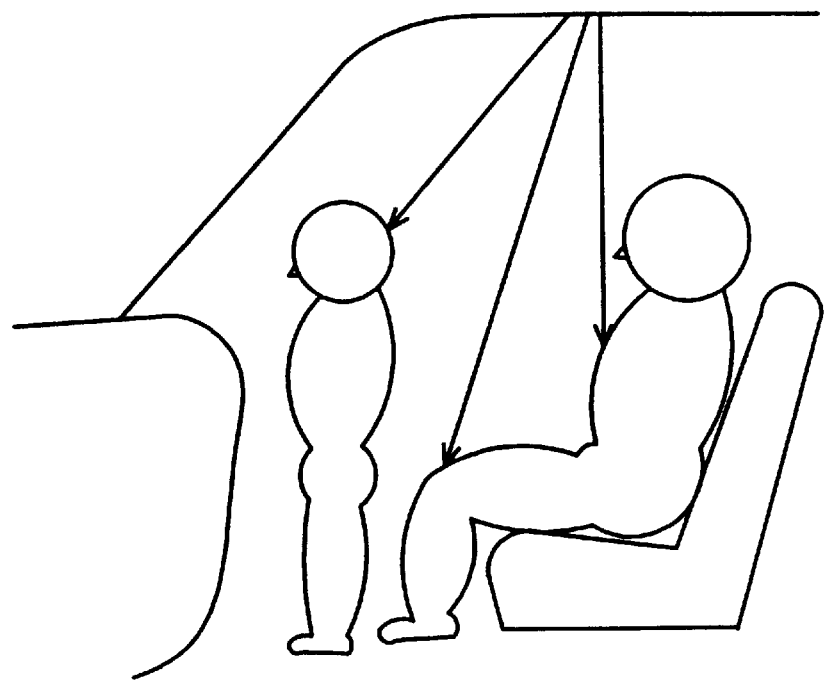
FIGS. 20 and 21 are diagrams illustrating states of occupants in the second embodiment and in a third embodiment, respectively.

That is, as shown in FIG. 18, change with time in sensed distance at the three measurement points P1, P4, and P7 in the front row shows a movement as shown by SG1 in FIG. 19A. Change with time in sensed distance at the other measurement points shows a movement as shown by SG2 in FIG. 19B. By executing the pattern matching, as shown in FIG. 20, it can be determined that the number of occupants is "2" and the occupants are a child and an adult. That is, it is determined that an adult in a proper position on the passenger seat and a child near the instrument panel are in the vehicle.

The occupant state information is obtained as mentioned above and a sense signal can be transmitted for the air bag control.

With respect to the sense signal transmitted in this case, six-bit information shown in FIG. 16 is transmitted serially.

As mentioned above, when a plurality of occupants are in the vehicle, change in sensed distance at each sense spot (motion speed, displacement total amount, frequency) can be identified by time-divisionally irradiating the nine LED spots and by performing the pattern matching with the previously-stored standard patterns.

Third Embodiment

A third preferred embodiment of the present invention will be described below mainly with respect to points different from the second embodiment.

The controller 24 in the third embodiment has a function of canceling background noise (movement of interior fixtures and the like) generated when no occupant is on the passenger seat in the vehicle from movement when the occupant is actually on the passenger seat.

Figure 21:
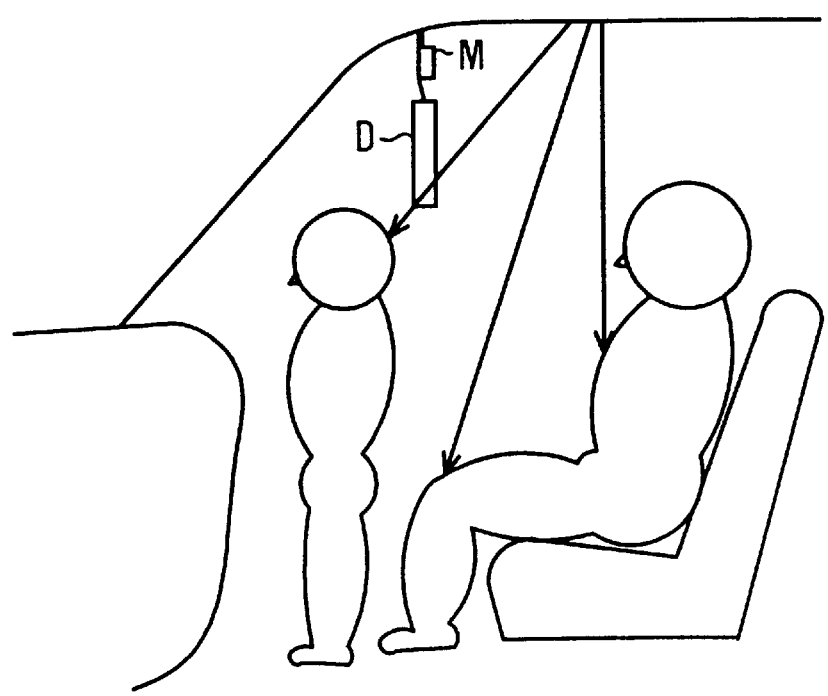
Figure 22A:
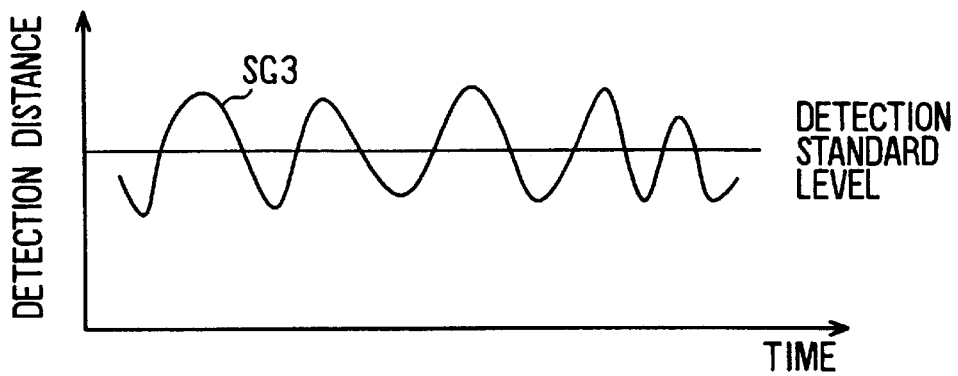
FIGS. 22A and 22B are diagrams showing variations in sensed distance with time in the third embodiment.
Figure 22B:
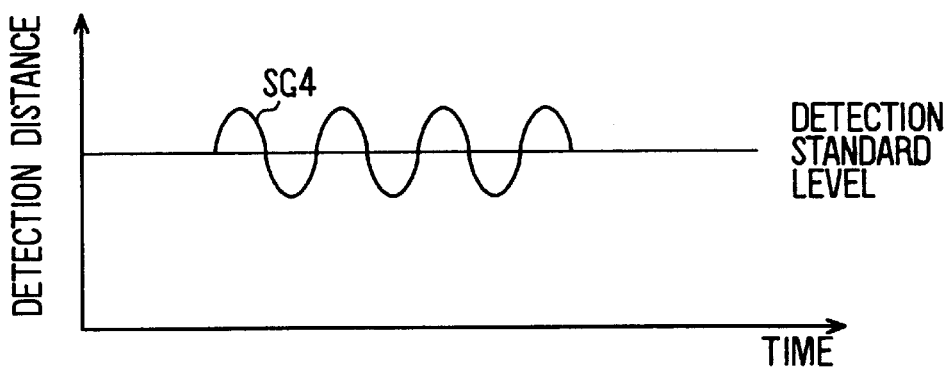

Specifically, the change with time in sensed distance at the three measurement points P1, P4, and P7 (refer to FIG. 18) in the front row shows a movement as shown in FIGS. 22A and 22B, and the movement of a fixture (background noise) D shown in FIG. 21 is canceled. Concretely, by executing an addition process, the movement of the fixture is canceled.

For example, as shown in FIG. 21, when the interior decoration D such as a doll or a lucky charm for safe driving is attached to a rear-view mirror M, the movement at one spot in the front row shows fluctuation for a certain period as shown by SG4 in FIG. 22B. The movement (SG4 in FIG. 22B) is previously stored in the memory 25 when no occupant exists, and the background noise part (SG4) is canceled from the movement of the occupant (SG3 in FIG. 22A), thereby permitting only the movement of the occupant to be accurately sensed.

That is, distances between the internal structure fixed in the passenger compartment, for example, the sitting face of the seat, the instrument panel, the floor face between the seat and a dashboard, and the like and the sensor in the state where no occupant exists are previously stored in the memory 25. The controller 24 executes the operation for canceling the background noises in Step 111 in FIG. 10. That is, fluctuation (predetermined frequency components) of the decoration D in the passenger compartment are canceled.

As mentioned above, the embodiment has the following characteristics.

A) The data regarding the background when no occupant exists in the vehicle is previously stored in the memory (storage means) 25, and the controller 24 (correction means) corrects the sensed data by the sensor 1 by canceling the background data.

Consequently, the background can be canceled and the object to be sensed can be very accurately specified.

In addition to the foregoing embodiments, the invention may be also embodied as follows.

The invention is not limited to the sensor 1 in which the nine electroluminescent elements and the three photoelectric elements are combined. The number of electroluminescent elements, the number of photoelectric elements, and the combination thereof can be changed according to detection resolution. The mounting angle of the electroluminescent elements and the photoelectric elements can be also changed according to the size of the vehicle, the size of the passenger compartment, and the sensing range.

Figure 23:
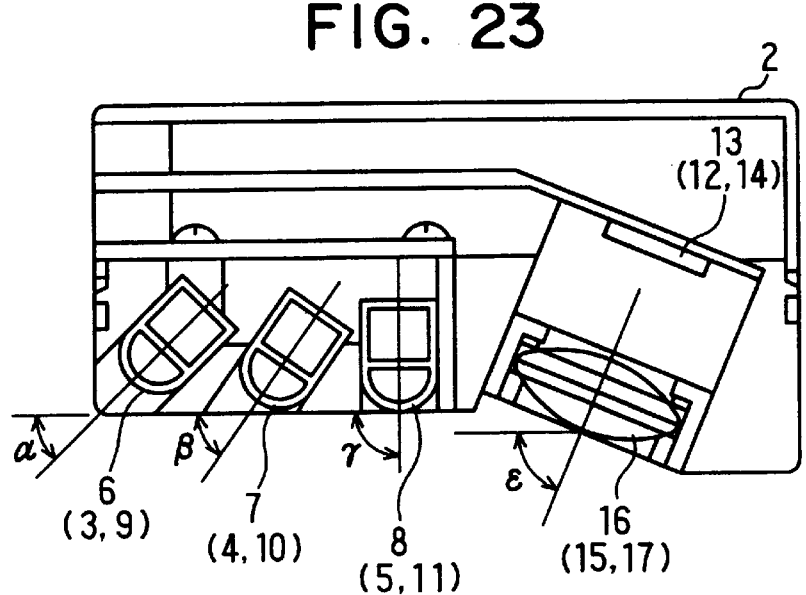
FIG. 23 is a vertical cross-sectional view of a sensor according to the third embodiment.

As shown in FIG. 23, in order to minimize and equalize the diameter of the spot on the face of the photoelectric element of the reflection light beam of the infrared ray irradiated from each of the infrared LEDs 3 to 11, when the mounting angle of the aspherical lenses 15 to 17 and the photodetectors 12 to 14 to the LEDs 3 to 11 in the sensor is set to the central angle ($\epsilon=67.5°$) of the maximum inclination ($\gamma=90°$ in FIG. 23) and the minimum inclination ($\alpha=45°$ in FIG. 23), the sensing range of the sensing distance can be enlarged and the resolution of the sensing distance can be further improved.

Although the air bag controller prevents the inflation of the air bag and performs the variable control of the inflation speed in correspondence with the signal transmitted from the passenger compartment state sensing apparatus in the foregoing embodiments, it can also perform only the prevention of the inflation of the air bag or only the variable control of the inflation speed. Variable control of the inflating direction (the orientation of the air bag) can be also executed in the air bag controller.

Although the optical sensor constructed by the electroluminescent elements and the photoelectric elements is used as the sensor 1, an ultrasonic sensor can be also used.

Although the nine electroluminescent elements are used in order to form the nine sensing regions, it is also possible that one electroluminescent and photoelectric element is provided and the element irradiates light beams to a plurality of points.

Further, the mounting position of the sensor is not limited to the ceiling, and the sensor can be also mounted in the instrument panel or the like.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A passenger compartment state sensor comprising:
   plurality of active emitter arrays, each being located in sensing proximity to a passenger compartment occupation area, and each for outputting directional radiation toward the occupation area so that a three-dimensional pattern of an object in the occupation area is formed by rays of the directional radiation reflected therefrom; and detecting means for sensing movement peculiar to the object in the occupation area by sensing the reflected rays of the directional radiation output by the plurality of emitter arrays, for determination of an object type based on the three-dimensional pattern.

2. An apparatus according to claim 1, wherein the detecting means detects the reflected rays of directional radiation so that the object may be classified as one of a human, an animal, and other.

3. An apparatus according to claim 1, wherein the detecting means is for sensing movement of a plurality of objects to be sensed.

4. The system of claim 1, wherein each of the plurality of emitter arrays comprises a plurality of linearly-arranged LEDs for generating infrared radiation according to a predetermined pattern, and the detecting means comprises a photodetector integrally arranged with the plurality of LEDs for detecting rays of infrared radiation reflected from the object.

5. The system of claim 4, wherein the plurality of LEDs and the photodetector together form a linear sensor assembly.

6. The system of claim 5, wherein each of the plurality of linear sensor assemblies is located in respective predetermined areas of the passenger compartment to enable a three-dimensional occupant shape pattern to be generated.

7. An apparatus according to claim 1, further comprising:
 determining means in communication with the detecting means for determining a type of the object based on the reflected rays sensed by the detecting means; and
 signal transmitting means for transmitting a signal indicative of the object type as sensed by the detecting means.

8. The system of claim 7, wherein the determining means is for determining the type of the plurality of objects based on at least one of a shape, peculiar movement and difference in distribution of each of the plurality of objects.

9. An apparatus according to claim 7, further comprising:
 storage means for storing data regarding background noise when no occupant is in a vehicle; and
 correction means for correcting sensing data obtained by the detecting means using the background data stored in the storing means.

10. An object position location system comprising:
 a sensor unit for detecting a position of an object in three-dimensional space and generating a sensor output representative thereof,
 object classification means for classifying the object in one of a predetermined number of categories based on the sensor output and for generating a classification output representative thereof; and
 load control means for controlling actuation of a load based on the classification output; wherein
  the object classification means includes integrating means for integrating the sensor output,
  the object classification means is for classifying the object based on the integrated sensor output,
  the sensor output corresponds to a detected distance between the object and the sensor unit, and
  the integrating means calculates both an integrated value of the detected distance and a movement speed of the object.

11. An object position location system comprising:
 a sensor unit for detecting a position of an object in three-dimensional space and generating a sensor output representative thereof;
 object classification means for classifying the object in one of a predetermined number of categories based on the sensor output and for generating a classification output representative thereof; and
 load control means for controlling actuation of a load based on the classification output;
  wherein the sensor unit comprises a plurality of linearly-arranged LEDs for generating infrared radiation according to a predetermined pattern, and a photodetector arranged behind the plurality of LEDs for detecting rays of the infrared radiation reflected from the object.

12. The system of claim 11, wherein the plurality of LEDs and the photodetector together form a linear sensor assembly.

13. The system of claim 12, further comprising a plurality of linear sensor assemblies located in respective predetermined areas of the passenger compartment that together enable an occupant shape pattern to be generated.

14. A passenger compartment occupant identification system, comprising:
 a plurality of strategically positioned active emitter arrays for generating rays of radiation directed to a vehicle occupant position;
 a plurality of detectors respectively associated with the plurality of emitter arrays for detecting reflected rays of radiation reflected from the vehicle occupant position, and for generating electric signals indicative thereof; and
 a controller in communication with the plurality of detectors for processing the electric signals to obtain a three-dimensional profile of an object, if any, in the vehicle occupant position to identify the object.

15. The system of claim 14, wherein the controller identifies the object based on temporal changes in output values of the plurality of emitter arrays, and the reflected radiation sensed by the plurality of detectors.

16. The system of claim 14, wherein only one of the plurality of detectors is associated with each of the plurality of emitter arrays.

17. The system of claim 14, wherein the plurality of emitter arrays emit directional infrared radiation.

18. The system of claim 14, wherein the controller is further for distinguishing between multiple objects in the occupant position based on the reflected rays of radiation detected by the plurality of detectors.

19. The system of claim 14, wherein the controller is further for canceling passenger compartment background noise based on reflected radiation detected by the plurality of detectors during a compartment non-occupied condition.

* * * * *